(12) United States Patent
De Graaf et al.

(10) Patent No.: US 7,757,738 B2
(45) Date of Patent: Jul. 20, 2010

(54) TYRE BELT DRUM

(75) Inventors: Martin De Graaf, Kz Emst (NL); Evert Doppenberg, Aa Deventer (NL)

(73) Assignee: VMI EPE Holland B.V., RK EPE (NL)

( * ) Notice: Subject to any disclaimer, the term of this patent is extended or adjusted under 35 U.S.C. 154(b) by 810 days.

(21) Appl. No.: 11/545,058

(22) Filed: Oct. 6, 2006

(65) Prior Publication Data

US 2007/0095481 A1    May 3, 2007

Related U.S. Application Data

(63) Continuation of application No. PCT/NL2005/000271, filed on Apr. 8, 2005.

(30) Foreign Application Priority Data

Apr. 8, 2004    (NL) .................................... 1025904

(51) Int. Cl.
    *B29D 30/24*    (2006.01)
(52) U.S. Cl. ...................... 156/417; 156/414
(58) Field of Classification Search .................. 156/415, 156/417–420, 414
    See application file for complete search history.

(56) References Cited

U.S. PATENT DOCUMENTS

| | | | |
|---|---|---|---|
| 3,207,648 A | 9/1965 | Shilts | |
| 3,485,692 A | 12/1969 | Frazier | |
| 3,607,558 A | 9/1971 | Nebout | |
| 3,887,423 A * | 6/1975 | Gazuit | 156/402 |
| 4,555,287 A * | 11/1985 | Goodfellow | 156/127 |
| 4,846,907 A | 7/1989 | Kumagai et al. | |
| 5,032,198 A | 7/1991 | Kojima et al. | |
| 5,232,542 A * | 8/1993 | Norjiri et al. | 156/417 |
| 5,254,204 A * | 10/1993 | Miyanaga et al. | 156/401 |
| 2004/0031569 A1 * | 2/2004 | Phippen | 156/414 |

FOREIGN PATENT DOCUMENTS

| | | |
|---|---|---|
| EP | 0 431 854 | 6/1991 |
| FR | 1 479 914 | 5/1967 |
| WO | 00/46018 | 8/2000 |

* cited by examiner

*Primary Examiner*—Geoffrey L Knable
(74) *Attorney, Agent, or Firm*—Ladas and Parry LLP

(57) ABSTRACT

Belt drum, particularly for shaping a belt layer and/or a tread layer or another tire component provided with metal parts and the like into a circumferential whole, wherein the drum is rotatable about a center line, comprising a number of support members having a rigid support surface for the tire component and situated at the circumference of the drum, wherein considered in a cross-sectional plane containing the center line, the support members comprise middle support sections and side support sections movably connected thereto, wherein the middle sections of the support members are moveable by first movement means between a first position, in which the respective support member forms a support surface that is parallel to the center line, and at least one second position, in which a substantially convex support surface is formed by the respective support member, wherein the first movement means are connected to the middle support sections in order to at least keep them parallel to the center line in at least the one second position.

20 Claims, 5 Drawing Sheets

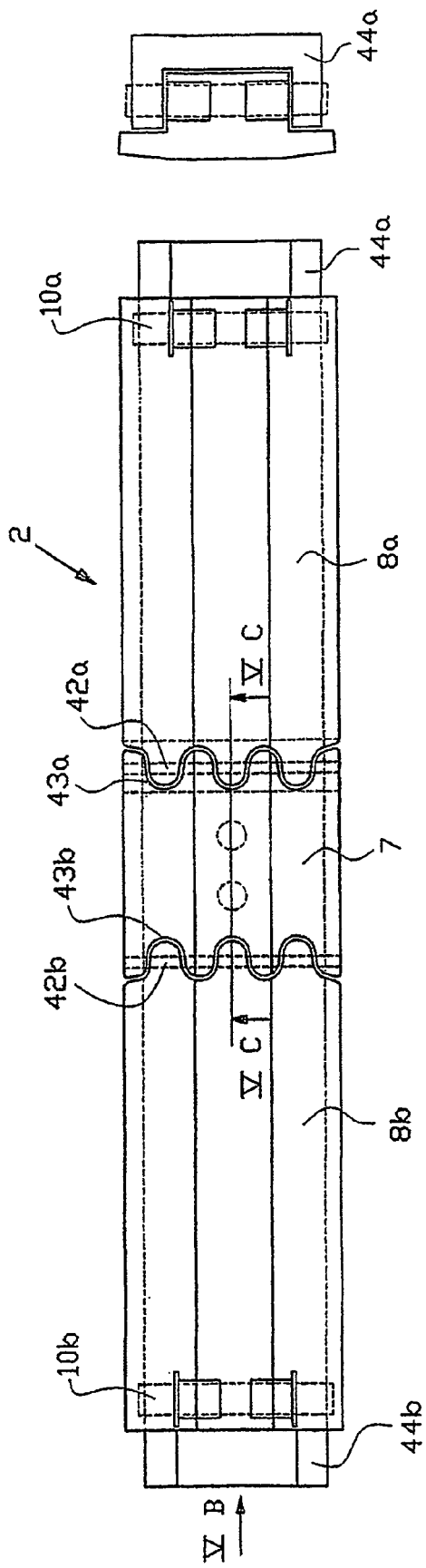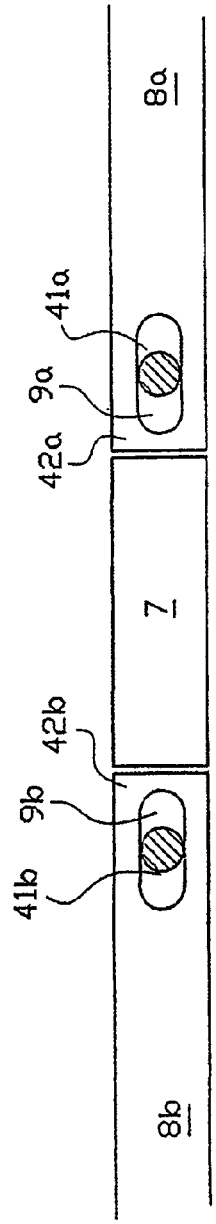
FIG. 5A
FIG. 5B
FIG. 5C

TYRE BELT DRUM

This application is a continuation of copending International Application NL2005/000271 filed on 8 Apr. 2005, which designated the U.S., claims the benefit thereof and incorporates the same by reference.

INTRODUCTION TO THE DESCRIPTION

The invention relates to a belt drum, particularly for shaping a belt layer and/or tread layer or another tyre component provided with reinforcement elements, such as of metal or aramide, and the like into a circumferential whole. The invention particularly relates to a drum on which a belt layer, a tread layer and an intermediately situated cap ply can be arranged.

In a process of manufacturing tyres it is known to make a package of several belt layers, optionally having opposite crossing steel wires, subsequently a so-called cap ply and finally one or more tread layers, on a drum, and then to supply the package to a carcass drum in order to be joined with the carcass parts for the tyre.

The cap ply can be arranged in the shape of a narrow, reinforced strip that is helically wound in one or several layers around the belt layers already arranged on the drum.

The more the shape of the cross-section of the tyre during the building process on the drum corresponds to the shape in the vulcanisation process, at the end of the manufacturing process of the tyre, the better a quality of tyre will be achieved.

It is desirable to arrange the strip on a diameter that corresponds with the final diameter dimension of the manufactured tyre as much as possible.

Furthermore in high performance tyres, in case of high speed, the tread of the tyre, which tread initially has a convex shape, will tend towards a flat condition. When the edge areas in the tread are only able to exert too low a resistance to the related diameter enlargement, undesired deformations may occur, which adversely affect the performance and driving comfort.

It is known to manufacture the tread on a drum having a membrane-like support surface on which the tread layers are arranged, after which by means of stamps positioned radially within the membrane and having a rigid pressure plane, the membrane is deformed to give the support surface, considered in longitudinal section of the drum, a convex shape, on which subsequently the strip of the cap ply is wound. As a result when arranging the cap ply strip, the tensions in said strip under conditions of use, for instance high speed, can be taken into account.

A drawback of this known approach is that applying the belt layers takes place on a membrane, which due to its nature cannot without additional measures offer a flat support surface to the belt layers. Furthermore when manufacturing tyres having treads of a deviating convexity, stamps adapted thereto will have to be arranged, which, if at all possible, is a laborious operation. Moreover several types of stamps will have to be kept ready.

There is a need for a belt drum with which in a simple and/or controllable way packages of at least belt layers and cap plies for tyres, such as for instance high performance tyres, can be made.

There is furthermore a need for a belt drum with which packages of at least belt layers and cap plies can be manufactured in optimal adjustment to extreme conditions of use of tyres, such as for instance high performance tyres.

There is furthermore a need for a belt drum with which packages of at least belt layers and cap plies can be manufactured in various diameters.

SUMMARY OF THE INVENTION

From one aspect the invention provides a belt drum, particularly for shaping a belt layer and/or a tread layer or another tyre component provided with metal parts and the like into a circumferential whole, wherein the drum is rotatable about a centre line, comprising a number of support members having a rigid support surface for the tyre component and situated at the circumference of the drum, wherein considered in a cross-sectional plane containing the centre line, the support members comprise middle support sections and side support sections movably connected thereto, wherein the middle sections of the support members are moveable by first movement means between a first position, in which the respective support member forms a support surface that is parallel to the centre line, and at least one second position, in which a substantially convex support surface is formed by the respective support member, wherein the first movement means are connected to the middle support sections in order to at least keep them parallel to the centre line in at least the one second position.

The belt drum may furthermore be provided with orienting means for keeping the middle support section parallel to the centre line at all times, in the one or several second positions and optionally in the first position as well.

From a further aspect the invention provides a belt drum, particularly for shaping a belt layer and/or a tread layer or another tyre component provided with metal parts and the like into a circumferential whole, wherein the drum is rotatable about a centre line, comprising a number of support members having a rigid support surface for the tyre component and situated at the circumference of the drum, wherein considered in a cross-sectional plane containing the centre line, the support members comprise middle support sections and side support sections movably connected thereto, wherein the middle sections of the support members are moveable by first movement means between a first position, in which the respective support member forms a support surface that is parallel to the centre line, and at least one second position, in which a substantially convex support surface is formed by the respective support member, wherein the middle support sections are attached to the first movement means with a rigid angle.

In this way the belt layers are at all times reliably supported, when being arranged on the drum and when being made convex.

Considered in plane parallel to the centre line, the support members are divided, as a result of which in principle several convex shapes can be achievable. In one embodiment of the belt drum according to the invention, the support members are movable to, particularly are adjustable in, several, selected second positions having a different convexity, so that the shape of the tread of a type of tyre to be manufactured can be specifically adjusted to.

The middle support sections can be connected to the related side support sections for subjecting them to a rotational motion during movement between the first position and the at least one second position.

The middle and side support sections may be connected to each other so as to be rotatable about an axis tangential to the drum.

The side support sections can be movably and rotatably connected to the rest of the drum, again considered in a plane of longitudinal section of the drum.

In one embodiment the drum has a plane of symmetry that is perpendicular to the centre line and the support members in the second position form a support surface that is symmetrical with respect to the plane of symmetry and in the middle support section is situated further from the centre line than the adjacent side sections are.

The middle support section can form a substantially closed and/or straight support surface.

The side sections can form straight support surfaces and can be rotatably connected to the rest of the drum about points of rotation that in a direction parallel to the centre line are spaced apart from the plane of symmetry.

In one embodiment the points of rotation between the support sections one to the other and/or between the support sections and the rest of the drum—considered in a direction parallel to the centre line—are adjustable.

In one embodiment, in which the shortening of the length in a direction parallel to the centre line as a result of the radial expansion can be compensated, the support sections at the location of the mutual connection are movable with respect to each other in a direction parallel to the centre line. This can be done by means of a mortise and tenon joint, particularly by means of a slotted hole.

For maintaining a support surface in axial direction that continues as much as possible, the support sections can engage into each other considered in a direction parallel to the centre line.

In a further development the belt drum according to the invention is provided with first stop means for limiting the radial outward movement of the support members to the second position, as well as with first adjustment means for adjusting the first stop means. In this way the second position and thus the convex shape can be adjusted adapted to the shape of the tread of the tyre to be manufactured.

The movement of the support members between the first and the second position can be easily and reliably achieved when the first movement means comprise first cone means and second cone means, wherein the first cone means are situated radially within the second cone means and are movable with a directional component in a direction parallel to the centre line in order to radially displace the second cone means, wherein the support members are connected to the second cone means for movement thereby movable according to a direction parallel to the centre line.

The said first stop means can be active in limiting the movement of the first cone means in a direction parallel to the centre line.

From a further aspect the invention provides a belt drum as described above, furthermore provided with second movement means for moving the support members from a position that is radially retracted with respect to the centre line to at least one position that is radially extended with respect to the centre line. Thus the diameter of the tyre to be manufactured can simply be adapted to using the same, shaping drum and the same support members.

The support members can be movable by means of the second movement means between both positions in a condition in which, considered in a cross-sectional plane containing the centre line, the support surfaces are situated parallel to the centre line.

The adjustment of the support members can be facilitated here by second stop means for limiting a joint radial outward movement of the support members, as well as by second adjustment means for adjusting the second stop means.

Just like the first movement means, the second movement means can comprise third cone means and fourth cone means, wherein the third cone means are situated radially within the fourth cone means and are movable with a directional component in a direction parallel to the centre line in order to radially displace the fourth cone means, wherein the support members are radially movable by the fourth cone means. The third cone means can be movable according to a direction parallel to the centre line. The second stop means can be active in limiting the movement of the second cone means in a direction parallel to the centre line.

In a combined embodiment of the belt drum according to the invention the third cone means are movable by the second cone means. The second adjustment means can be active in adjusting the distance between the second and the third cone means, considered in a direction parallel to the centre line.

From a further aspect the invention provides a belt drum, particularly for shaping a belt layer and/or a tread layer or another tyre component provided with metal parts and the like into a circumferential whole, wherein the drum is rotatable about a centre line, comprising a number of support members having a rigid, particularly substantially closed support surface for the tyre component, and situated at the circumference of the drum, wherein considered in a cross-sectional plane containing the centre line of the drum, the support members are moveable by first movement means between a first position, in which a support surface is formed that is parallel to the centre line and at least one second position, in which a substantially convex support surface is formed.

From a further aspect the invention provides a belt drum, particularly for shaping a belt layer and/or a tread layer or another tyre component provided with metal parts and the like into a circumferential whole, wherein the drum is rotatable about a centre line, comprising a number of support members having a rigid support surface for the tyre component and situated at the circumference of the drum, wherein considered in a cross-sectional plane containing the centre line, the support members are moveable by movement means between a first position, in which a support surface is formed that is parallel to the centre line and is situated at a first radial distance from the centre line and at least one second position, in which a support surface is formed that is parallel to the centre line and is situated at a second radial distance that is larger than the first radial distance from the centre line, wherein the movement means comprise first cone means and second cone means, wherein the first cone means are situated radially within the second cone means and are movable with a directional component in a direction parallel to the centre line in order to radially displace the second cone means, wherein the support members are connected to the second cone means for movement thereby. In this way the belt drum can easily and reliably be adjusted as regards diameter.

In one embodiment the first cone means are movable according to a direction parallel to the centre line.

In one embodiment the belt drum is provided with first stop means for limiting a radial outward movement of the support members, as well as with first adjustment means for adjusting the first stop means, wherein the first stop means are active in limiting the movement of the first cone means in a direction parallel to the centre line.

The aspects and measures described and/or shown in the application can where possible also be applied independent from each other. The individual aspects, such as support surface movement and support surface design and cone positioning, and other aspects may be the subject of divisional applications related thereto.

BRIEF DESCRIPTION OF THE DRAWINGS

The invention will be elucidated on the basis of a number of exemplary embodiments shown in the attached drawings, in which:

FIGS. 5A-C show a top view, end view and side view, respectively, of an exemplary embodiment of support members for a drum according to the invention;

DETAILED DESCRIPTION OF THE DRAWINGS

Figure 1:
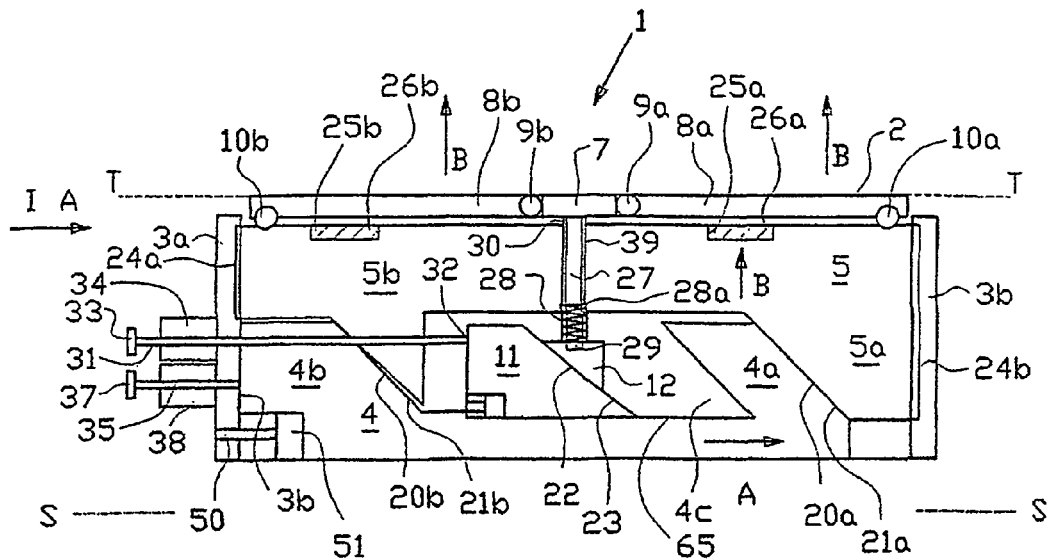
FIG. 1 shows a schematic cross-section, of one half of an exemplary embodiment of a drum according to the invention, in the initial position.

The drum 1, partially shown in FIG. 1, has a centre line S and has a circumferential series of support members 2 and end walls 3a, 3b. In the centre of the drum 1, coaxially about centre line S, a circumferential cone 4 formed as one body is accommodated so as to be slidable in a direction parallel to the centre line S, which cone 4 is provided with cone members 4a, 4b that are also circumferential. Cone members 4a and 4b have respective cone surfaces 20a, 20b that form circumferential cone surfaces. Said cone surfaces may form facets, that means that they are built up from a series of flat parts.

Radially outside the cones 4, pressure members 5 are arranged, for instance 24, provided with inwardly extending cone members 5a, 5b provided with cone surfaces 21a, 21b, that are oriented radially inclined to the inside, and which cooperate with cone surfaces 20a, 20b. At the radial outer surface of the pressure members 5 recesses 25a, 25b are arranged, in which circumferential contraction bands 26a, 26b have been accommodated.

At the axial ends the pressure members 5 are guided so as to be radially slidable in guides 24a, 24b in end walls 3a, 3b.

At the radial outside of the pressure members 5 support members 2 are supported, which define a level, substantially closed support surface T. As can also be seen in FIGS. 5A-C the support members 2 form plates, in this example 24, in a number equal to the pressure members 5. In this example the support members 2 have three parts, namely a (in both plane main directions) rigid middle section 7 and (in both plane main directions) rigid side sections 8a, 8b. At the location of the hinge pins 9a, 9b the middle section 7 is hinged to the side sections 8a, 8b. At the location of hinges 10a, 10b the side sections 8a, 8b are hinged to the pressure member 5, in this case near its axial ends, also see FIG. 5A-C.

It can furthermore be seen in FIG. 1 that a rod 35 projects in axial direction from the cone member 4b, which rod at one end is provided with a stop 37. Said stop may abut the permanent stop 38, that is attached to end wall 3a. The location of the stop 37 along rod 35 can be adjusted using means that are not further shown, in order to adjust the freedom of movement in the direction A of the cone member 4.

FIG. 1 furthermore shows a pneumatic cylinder 51 which by means of line 50 is connected to a source of compressed air that is not further shown. They ensure the drive of the cone member 4 in the direction A, parallel to the centre line S.

A space 4c is left open between the cone members 4a, 4b, in which a circumferential cone ring 11, forming one unity, is arranged so as to be slidable in axial direction (S) over the radial outer surface 60 of cone 4. The cone ring 11 is provided with a cone surface 22, that may also be provided with facets, in this case also 24. A pressure piece 12 with a slanted surface 23 thereof supports on the cone surface 22. In the radial direction a pin 27 extends from the pressure piece 12, which pin at the location of 29 is attached in pressure piece 12 and at the location of 30, in two directions that are perpendicular to each other, is rotation-fixedly or rigidly (forming a rigid angle) attached to the middle section 7. The pin 27 extends through a radial passage 39 in pressure member 5. A compression spring 28 is placed around pin 27, and on the one hand rests against a radial inner surface on pressure member 5, for instance in the bottom of a recess 28a formed therein, and on the other hand against a radial outer surface of pressure piece 12.

In axial direction to the left a rod 31 extends from the cone ring 11, at the end of which rod a stop 33 is attached. For the stop 33 a permanent stop 34 is attached on the end wall 3a. The location of the stop 33 along the rod 31 can be adjusted using means that are not further shown, in order to adjust the freedom of movement in the direction C (FIG. 3) of the cone member 4.

For movement in the direction C (FIG. 3) of the cone ring 11 use is made of a pneumatic cylinder 53, which by means of line 52 is connected to a source of compressed air.

It is noted that instead of said pneumatic cylinders use can be made of other movement means, such as hydraulic cylinders or spindle drives.

In the FIGS. 5A-C an example of support members 2 is shown, wherein a middle section 7 is provided with an undulating edge, having projecting fingers 43a, b. The side sections 8a, b at the adjacent edges are provided with finger-shaped protrusions 42a, 42b, which interengage all-round with the fingers 43a, 43b, for forming a substantially closed support surface T, in the initial position.

At the other ends by means of pins 10a, 10b the side sections 8a, 8b are hingedly attached in holders 44a, 44b, that are fixed to pressure member 5.

As shown in FIG. 5C the hinge pins 9a, 9b with which the middle section 7 is hinged to the side sections 8a, 8b, are accommodated so as to be freely slidable (transverse to pin direction) in longitudinal holes 41a, 41b. As a result room is provided to an enlargement of the length defined by the sections 7, 8a, 8b when the support members 2 are in the position shown in FIG. 3. The finger interengagement 42a,b-43a,b prevents the creation of a transverse interruption in the support surface. It is noted that instead of hinge pins a rotatable connection with slide option can also be realised in other ways, for instance using a groove and tongue connection, wherein the tongue protrudes to such an extent into the groove that also in the expanded position it remains extending into the groove.

In the initial position of the drum 1 shown in FIG. 1, the support members are placed with the support surface in the plane T. In said initial position belt layers are arranged, optionally with consecutive crosswise oriented reinforcement cords.

Figure 2:
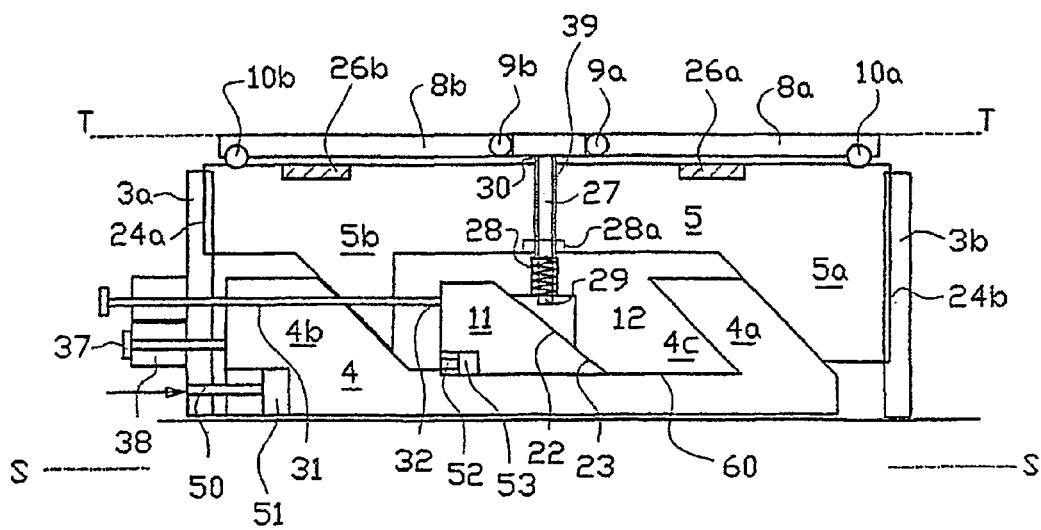
FIG. 2 shows the drum of FIG. 1, in expanded position.
Figure 1A:
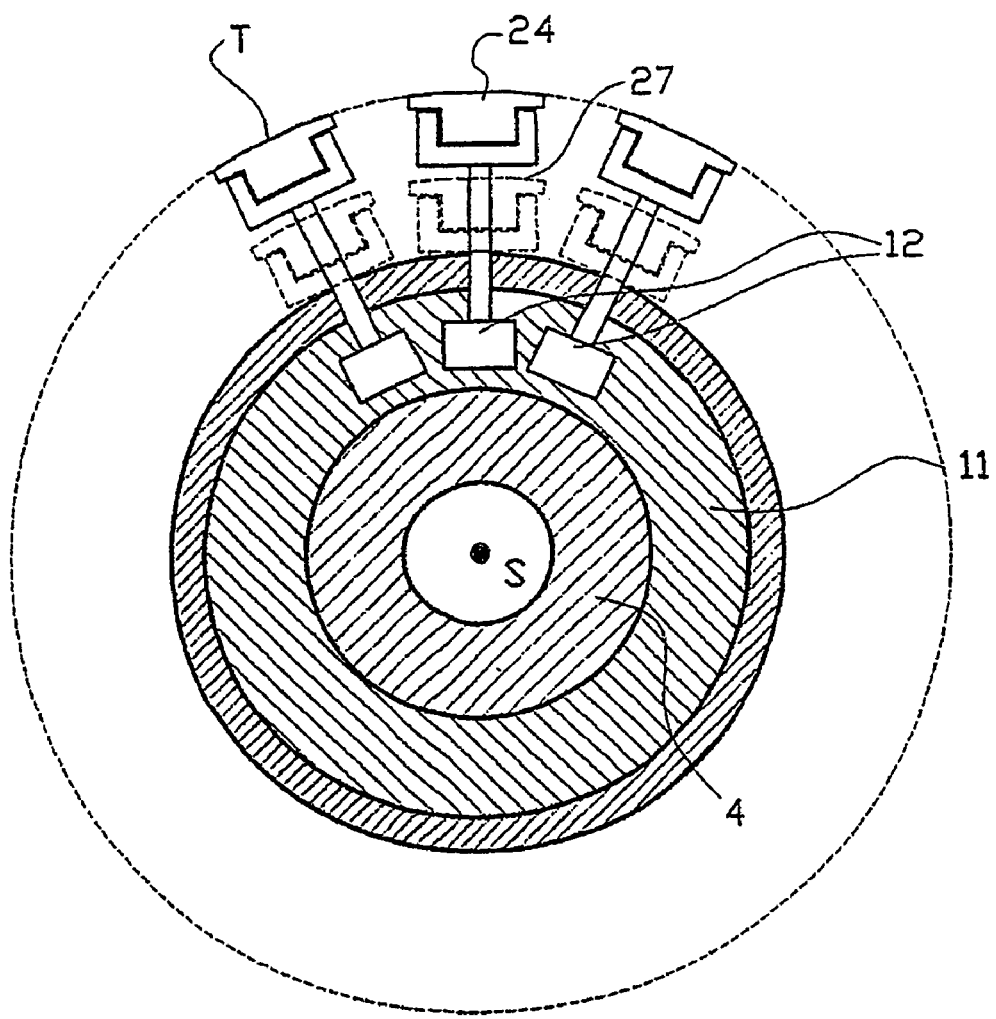
FIG. 1A shows a cross-section according to arrow IA-IA of the drum of FIG. 1.

If a larger diameter of the support members is required, in connection with the diameter of the tyre to be manufactured, the air cylinder 51 is activated via the compressed air line 50, in order to move the cone 4 in the direction A. By cooperation of the surfaces 20a, b and 21a, b each pressure member 5 will be urged in the direction B radially to the outside. The pressure member 5 will then be guided in guides 24a, b. Said movement radially to the outside is counteracted by the contraction bands 26a, b. The radial distance between surface T and the centre line S is increased here, until finally the situation shown in FIG. 2 is achieved. The stop 32 has then abutted the stop 38. By adjustment thereof the desired distance S-T can be adjusted as desired.

During the movement of the cone 4 in the direction A, the cone ring 11, when considered axially, has been able to remain in its place. The support members 2 with their support surface are then still axially straight in the surface T.

Figure 3:
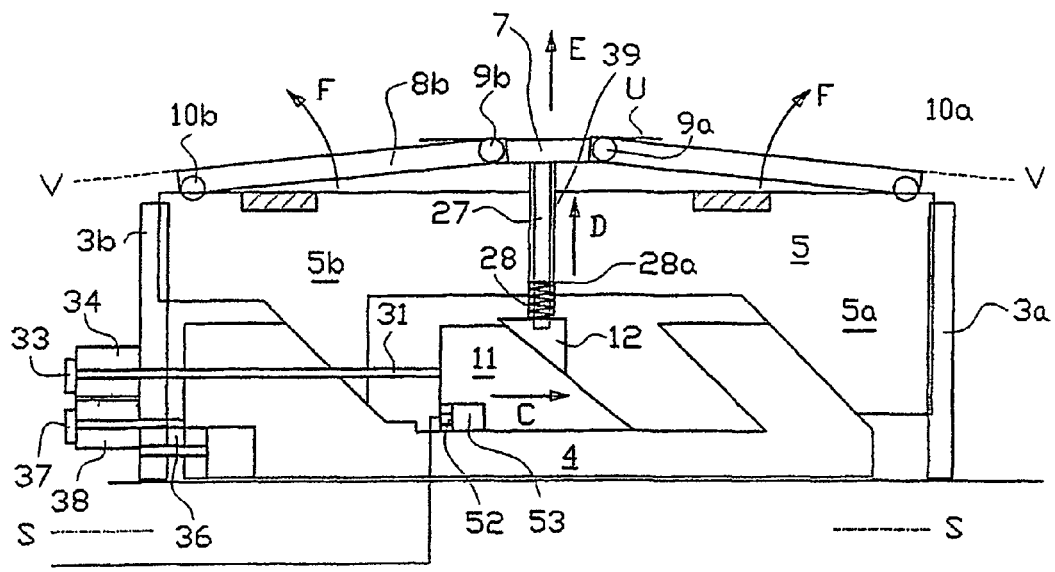
FIG. 3 shows the drum of FIG. 2, in a convex shaping position.

Subsequently, in the position shown in FIG. 1, or shown in FIG. 2, a so-called cap ply is wound on the belt layers that have already been arranged, by means of a rubber strip provided with nylon reinforcement cords or reinforcement cables. Prior to commencing this, compressed air is put on line 52, for operating the pneumatic cylinder 53, in order to move the cone ring 11 in the direction C (FIG. 3). By cooperation of the surfaces 22 and 23 the pressure piece 12 will move radially to the outside in the direction D and thus will the pin 27 and thus will the middle section 7, which due to the rigid connection 30 to the pin 27 will remain parallel to the centre line S with its support surface U. Because considered radially the pressure member 5 remains in its place, and as a result so will the hinges 10a, 10b, the side sections 8a, 8b will tilt in the direction F. The hinge pins 9a, 9b here move within the longitudinal holes 41a, b. The movement in the direction D stops when the stop 33 abuts the stop 34. By adjusting the stop 33 along the rod 31 the degree of expansion in the direction D can be adjusted, and thus the convex shape, in this case buckled convex shape, can be adjusted. In the case of FIG. 3 it then regards the angle between the slanted surfaces V and the surface U, the latter surface being parallel to the centre line S. The position of the middle section 7 can here remain positively controlled in the selected positions.

Figure 6:
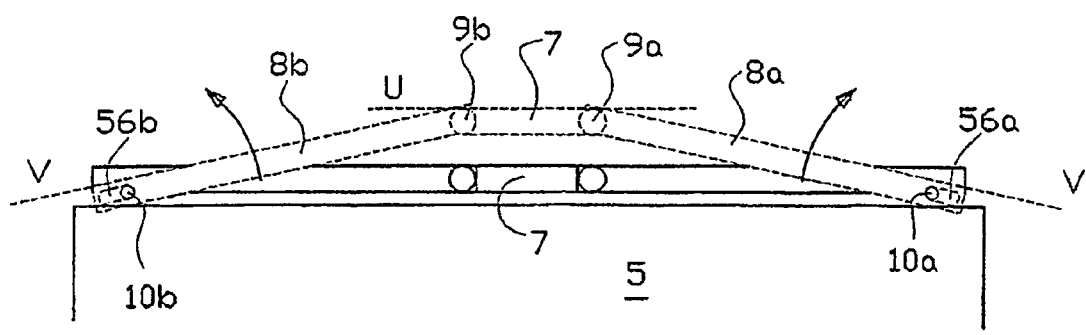
FIGS. 6 and 7 show schematic views of two possible embodiments of support members in a drum according to the invention.

In FIG. 6 an alternative option is shown, wherein the hinge pins 10a, 10b are accommodated in longitudinal holes 56a, 56b in parts (that are not shown) 44a, 44b. The longitudinal holes 41a, b at the location of hinge pins 9a, 9b can then be dispensed with.

Figure 7:
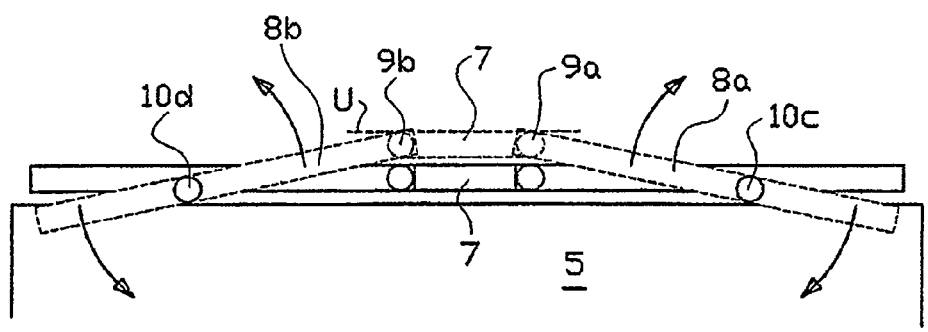

In FIG. 7 a further alternative is shown, wherein the hinge pins 10a, b have been replaced by hinge pins 10c, 10d that are situated further away from the axial ends of the side sections 8a, b. If so desired either the hinge pins 9a, 9b or the hinge pins 10c, 10d may be accommodated in longitudinal holes.

In the convex condition of the support members 2, as mentioned before, the strip for the cap ply is wound. After this has been done, the tread layers can be applied in order to complete the package, prior to this package being transferred to another drum, for instance a shaping/turn-up drum.

Figure 4:
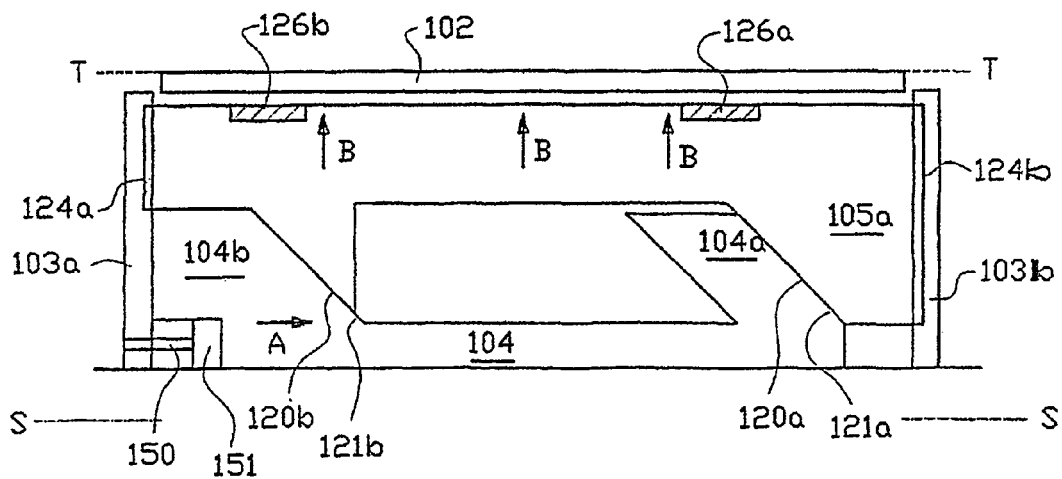
FIG. 4 shows an alternative exemplary embodiment of a drum according to the invention, in a cross-section comparable to the one of FIG. 1, however, without the possibility of shaping.

In FIG. 4 a drum according to the invention is shown, wherein only use is made of radial expansion in the direction B of pressure member 105, in order to bring the support members 102 with support surface T at a larger radial distance from centre line S. Comparable parts have comparable reference numbers, increased by 100.

When a package is ready the compressed air on the lines 50 or 52 can be released for facilitating taking the package from the drum 1, after which under the influence of the contraction bands 26a, b, 126a, b and the compression spring 28 a returning motion of the various parts takes place, until in the initial position of FIG. 1.

The invention claimed is:

1. A belt drum, particularly for shaping a belt layer and/or a tread layer or another tire component provided with metal parts into a circumferential whole, wherein the drum is rotatable about a center line, comprising a number of support members having a rigid support surface for the tire component and situated at the circumference of the drum, wherein considered in a cross-sectional plane containing the center line, the support members comprise middle support sections and side support sections movably connected thereto, wherein the middle sections of the support members are moveable by driven first movement assemblies between a first position, in which the respective support member forms a support surface that is parallel to the center line, and at least one second position, in which a substantially convex support surface is formed by the respective support member, wherein the first movement assemblies are connected to the middle support sections in order to at least keep them parallel to the center line in at least the one second position, and wherein the first movement assemblies comprise first cone members and second cone members, wherein the first cone members are situated radially within the second cone members and are moveable with a directional component in a direction parallel to the center line in order to radially displace the second cone members, and the support members are connected to the second cone members for movement thereby, said belt drum further being provided with second movement assemblies for moving the support members from a position that is radially retracted with respect to the center line to at least a position that is radially extended with respect to the center line, wherein the support members are movable by means of the second movement assemblies between both positions in a condition in which the support surfaces, considered in a cross-sectional plane containing the center line, are situated parallel to the center line, and wherein the second movement assemblies comprise third cone members and fourth cone members, wherein the third cone members are situated radially within the fourth cone members and are movable with a directional component in a direction parallel to the center line in order to radially displace the fourth cone members, wherein the support members are radially movable by the fourth cone members.

2. Belt drum according to claim 1, wherein the middle support section is kept to be oriented parallel to the center line at all times.

3. Belt drum according to claim 1, wherein the middle support sections are fixedly attached to the first movement assemblies.

4. Belt drum according to claim 1, wherein the support members are movable to and adjustable in several selected second positions having a different convexity.

5. Belt drum according to claim 1, wherein the middle support sections are connected to the related side support sections for subjecting them to a rotational motion during movement between the first position and the at least one second position.

6. Belt drum according to claim 1, wherein the middle and side support sections are connected to each other so as to be rotatable about an axis tangential to the drum.

7. Belt drum according to claim 1, wherein the side support sections are movably and rotatably connected to the rest of the drum, again considered in a plane of longitudinal section of the drum.

8. Belt drum according to claim 1, wherein the drum has a plane of symmetry that is perpendicular to the center line and the support members in the second position form a support surface that is symmetrical with respect to the plane of symmetry and the middle support section is situated further from the center line than the adjacent side sections are.

9. Belt drum according to claim 1, wherein the drum has a plane of symmetry and the side sections form straight support surfaces and are rotatably connected to the rest of the drum about points of rotation that in a direction parallel to the center line are spaced apart from the plane of symmetry.

10. Belt drum according to claim 9, wherein the points of rotation between the support sections one to the other and/or between the support sections and the rest of the drum, considered in a direction parallel to the center line, are adjustable.

11. Belt drum according to claim 1, wherein the support sections at the location of the mutual connection are movable with respect to each other in a direction parallel to the center line.

12. Belt drum according to claim 1, wherein the support sections engage into each other considered in a direction parallel to the center line.

13. Belt drum according to claim 1, further comprising a first stop for limiting a radial outward movement of the support members to the second position, and a first adjuster for adjusting the first stop.

14. Belt drum according to claim 1, wherein the first cone members are movable according to a direction parallel to the center line.

15. Belt drum according to claim 1, further comprising a first stop for limiting a radial outward movement of the support members to the second position, and a first adjuster for adjusting the first stop, wherein the first stop is active in limiting the movement of the first cone members in a direction parallel to the center line.

16. Belt drum according to claim 1, provided with a second stop for limiting a joint radial outward movement of the support members, as well as with a second adjuster for adjusting the second stop.

17. Belt drum according to claim 1, wherein the third cone members are movable according to a direction parallel to the center line.

18. Belt drum according to claim 1, provided with a second stop for limiting a joint radial outward movement of the support members, as well as with a second adjuster for adjusting the second stop, wherein the second stop is active in limiting the movement of the second cone members in a direction parallel to the center line.

19. Belt drum according to claim 1, provided with a second stop for limiting a joint radial outward movement of the support members, as well as with a second adjuster for adjusting the second stop, wherein the second adjuster is active in adjusting the distance between the second and the third cone members, considered in a direction parallel to the center line.

20. Belt drum according to claim 1, wherein the support members are biased to the first position.

* * * * *